United States Patent
Kong et al.

(10) Patent No.: US 11,214,326 B2
(45) Date of Patent: Jan. 4, 2022

(54) FOOTREST WITH INTEGRATED TOW HANDLE FOR PORTABLE CONVEYANCE

(71) Applicant: Probity Cell LLC, Holdrege, NE (US)

(72) Inventors: Zhenghua Kong, Vernon Hills, IL (US); Kai Wang, Suzhou (CN); Robert McCormick, Holdrege, NE (US); Wei Chang, Bufallo Grove, IL (US)

(73) Assignee: Probity IP LLC, Holdrege, NE (US)

( * ) Notice: Subject to any disclaimer, the term of this patent is extended or adjusted under 35 U.S.C. 154(b) by 221 days.

(21) Appl. No.: 16/378,164

(22) Filed: Apr. 8, 2019

(65) Prior Publication Data

US 2020/0317287 A1  Oct. 8, 2020

(51) Int. Cl.
- B62J 25/00 (2020.01)
- B62K 5/02 (2013.01)
- B62K 15/00 (2006.01)

(52) U.S. Cl.
CPC ............... B62J 25/00 (2013.01); B62K 5/02 (2013.01); B62K 15/006 (2013.01); *B62K 2202/00* (2013.01)

(58) Field of Classification Search
CPC .. B62J 25/00; B62J 25/04; B62K 5/02; B62K 5/023; B62K 5/025; B62K 15/006; B62K 2202/00; Y10T 74/20918; B62M 5/00
USPC ................................... 74/564; 280/278, 291
See application file for complete search history.

(56) References Cited

U.S. PATENT DOCUMENTS

| | | | |
|---|---|---|---|
| 2,461,049 A | 2/1949 | Gamble | |
| 5,401,045 A | 3/1995 | Foerster et al. | |
| 5,524,915 A * | 6/1996 | Liu | B25H 3/023 206/372 |
| 6,719,316 B1 | 4/2004 | Anthony | |
| 6,902,174 B2 * | 6/2005 | Hernandez | B25H 5/00 280/32.6 |
| 6,988,586 B1 * | 1/2006 | Perez | E06C 1/393 182/21 |
| 7,150,461 B2 * | 12/2006 | Schnuckle | A63C 11/023 280/87.05 |
| 7,527,276 B2 | 5/2009 | Schmautz | |
| 2006/0219453 A1 | 10/2006 | Chen | |

FOREIGN PATENT DOCUMENTS

EP   1886908   8/2009

* cited by examiner

*Primary Examiner* — Minnah L Seoh
*Assistant Examiner* — Hosam Shabara
(74) *Attorney, Agent, or Firm* — Fish & Richardson P.C.

(57) ABSTRACT

A portable conveyance footrest has a support portion having a substantially planar base surface to receive a foot. A tow handle portion is connected to an end of the support portion and forms a substantially planar tow handle that is within a same plane as the substantially planar base surface. The tow handle is spaced apart from the end of the support portion to define a void between the tow handle and the second end of the support portion. The tow handle is disposed within the same plane as the substantially planar base surface so that a user's fingers, when gripping the tow handle, extend into the void between the tow handle and the end of the support portion and through the plane of the substantially planar surface.

20 Claims, 8 Drawing Sheets

FOOTREST WITH INTEGRATED TOW HANDLE FOR PORTABLE CONVEYANCE

BACKGROUND

This specification relates to portable conveyances, and in particular to folding portable conveyances.

Portable conveyances are very popular forms of transportation for people with mobility problems. Such portable conveyances typically have two rear wheels and one front wheel. Many persons using such portable conveyances are not completely non-ambulatory, and thus do not need to use the portable conveyance at all times. Accordingly, folding portable conveyances allow users to store the portable conveyances in an area that has a smaller "footprint" than would otherwise be required for a portable conveyance that does not fold into a compact form for storage.

Portable conveyances are also very popular forms of transportation. With the advent of environmental awareness and a concomitant acceptance of alternative forms of transportation, many people now use portable conveyances for portions of their commutes to and from their working locations. Portable conveyances are especially popular for "first and last" mile commuting. For example, a person may use a portable conveyance to travel from her home to a metro rail station, and then collapse the portable conveyance into a storage and towing configuration that allows the user to transport more easily the conveyance onto the rail car. The person may thereafter use the portable conveyance to travel from her destination rail station to her place of work. Finally, while at work, the person may store the conveyance in the collapsed configuration in her office during the work day.

Existing portable conveyances still have several drawbacks, however. One drawback is a lack of a convenient gripping fixture that a user can grip for towing the portable conveyance when it is in a folded, or towing, configuration. Some conveyances have handles integrated into the frame and that can be unlocked and extended for towing. However, such handles are prone to breaking, and integrating such handles into the frame of the portable conveyance increases the manufacturing cost of the portable conveyance.

Some portable conveyances also must be partially disassembled in the folded state. Usually the disassembly requires removal of the seat, and the seat is stored in a small seat retention tube on the frame while the frame is folded. If the seat is a large sized seat, it may be too large to store on a seat retention tube when the frame is folded. Thus, when a person needs to move the personal conveyance in the folded state, the user must not only tow the conveyance, but must also carry the seat. Additionally, there is usually no convenient way to store the seat with the portable conveyance in the folded state.

SUMMARY

In general, one innovative aspect of the subject matter described in this specification can be embodied a portable conveyance footrest, comprising: a support portion having a substantially planar base surface to receive a heel of a foot at a first end of the support portion and to receive another portion of the foot at a second end of the support portion that is opposite the first end so that a foot so received may rest on the substantially planar base surface; and a tow handle portion connected to the support portion at the second end, the tow handle portion forming a substantially planar tow handle that is within a same plane as the substantially planar base surface, the tow handle portion defining a void between the tow handle and the second end of the support portion, the tow handle disposed within the same plane as the substantially planar base surface so that a user's fingers, when gripping the tow handle, extend into the void between the tow handle and the second end of the support portion and through the plane of the substantially planar surface.

Particular embodiments of the subject matter described in this specification can be implemented so as to realize one or more of the following advantages. The portable conveyance footrest, when mounted on a collapsible frame in which the footrests are at the top of the frame when in the collapsed configuration, provide tow handles that do not need to be unlocked or otherwise manually disposed from the frame of the conveyance. This simplifies the manufacturing process and reduces overall manufacturing costs. In implementations in which the footrest is of a reflective symmetric geometry, manufacturing costs are further reduced, as the same footrest can be installed on either side of the conveyance. Finally, for conveyances that have folding seats that are removed to collapse the frame, but are too large to attach to a seat retainer, a distal extension of the footrest provides a convenient mounting tab upon which the folded seat may be stored.

The details of one or more embodiments of the subject matter described in this specification are set forth in the accompanying drawings and the description below. Other features, aspects, and advantages of the subject matter will become apparent from the description, the drawings, and the claims.

Figure 1:
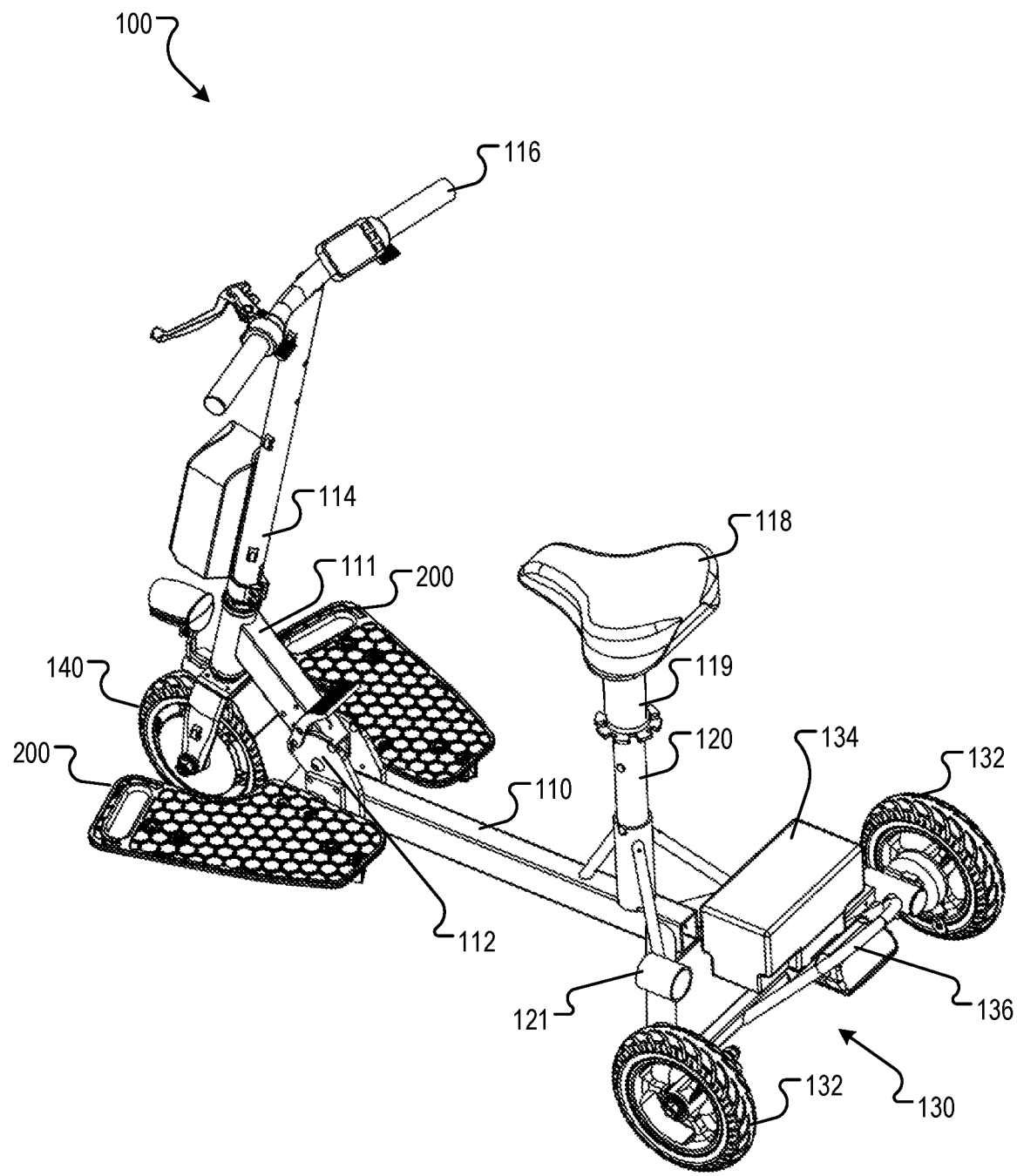
FIG. 1 is a perspective view of a portable conveyance in a riding configuration.

Like reference numbers and designations in the various drawings indicate like elements. To avoid congestion in the drawings and for brevity of description, reference numbers may not be repeated in subsequent drawings and descriptions of elements previously described may be omitted in subsequent drawings.

DETAILED DESCRIPTION

Figure 2:
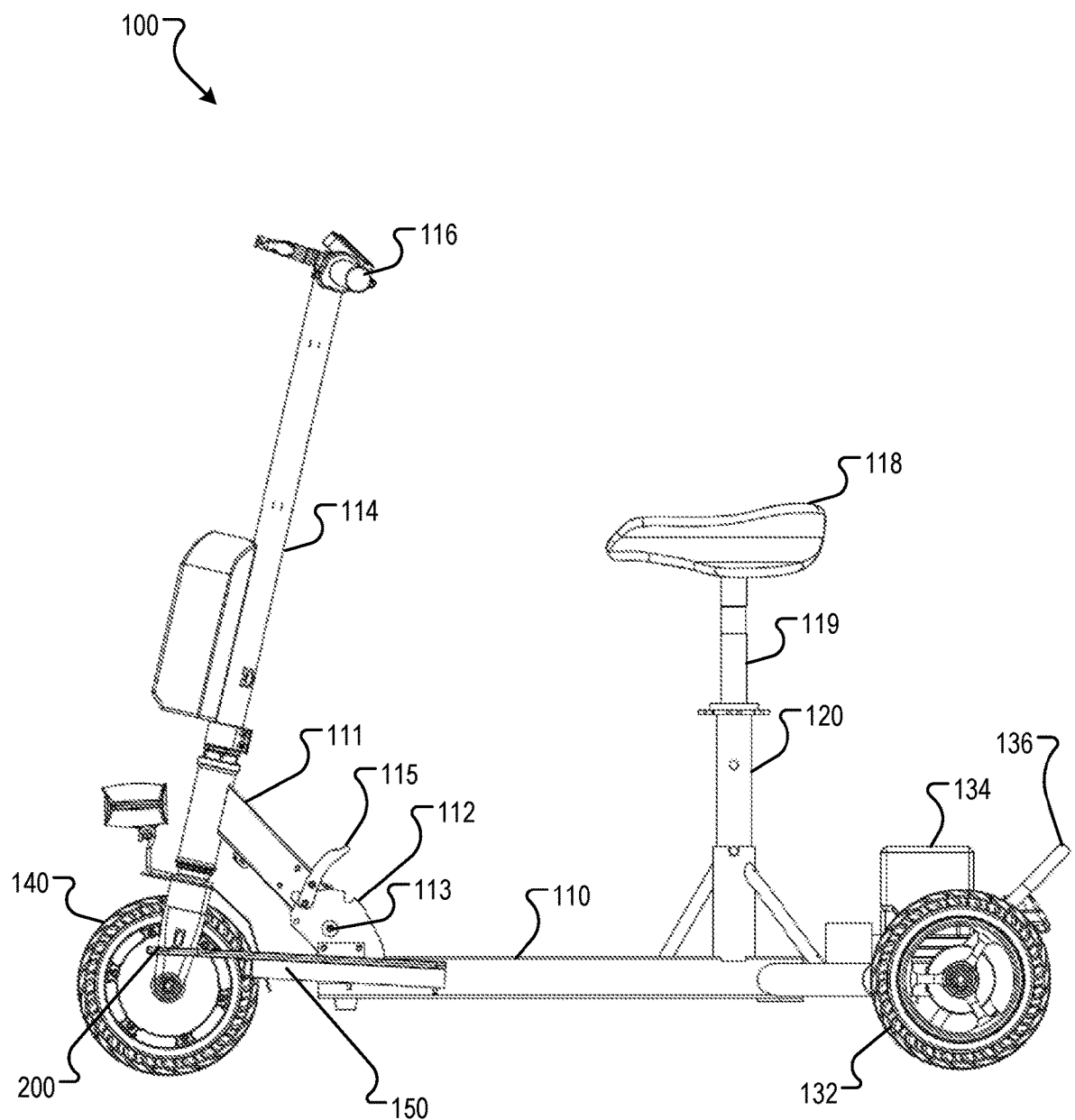
FIG. 2 is a side view of the portable conveyance in the riding configuration.
Figure 3:
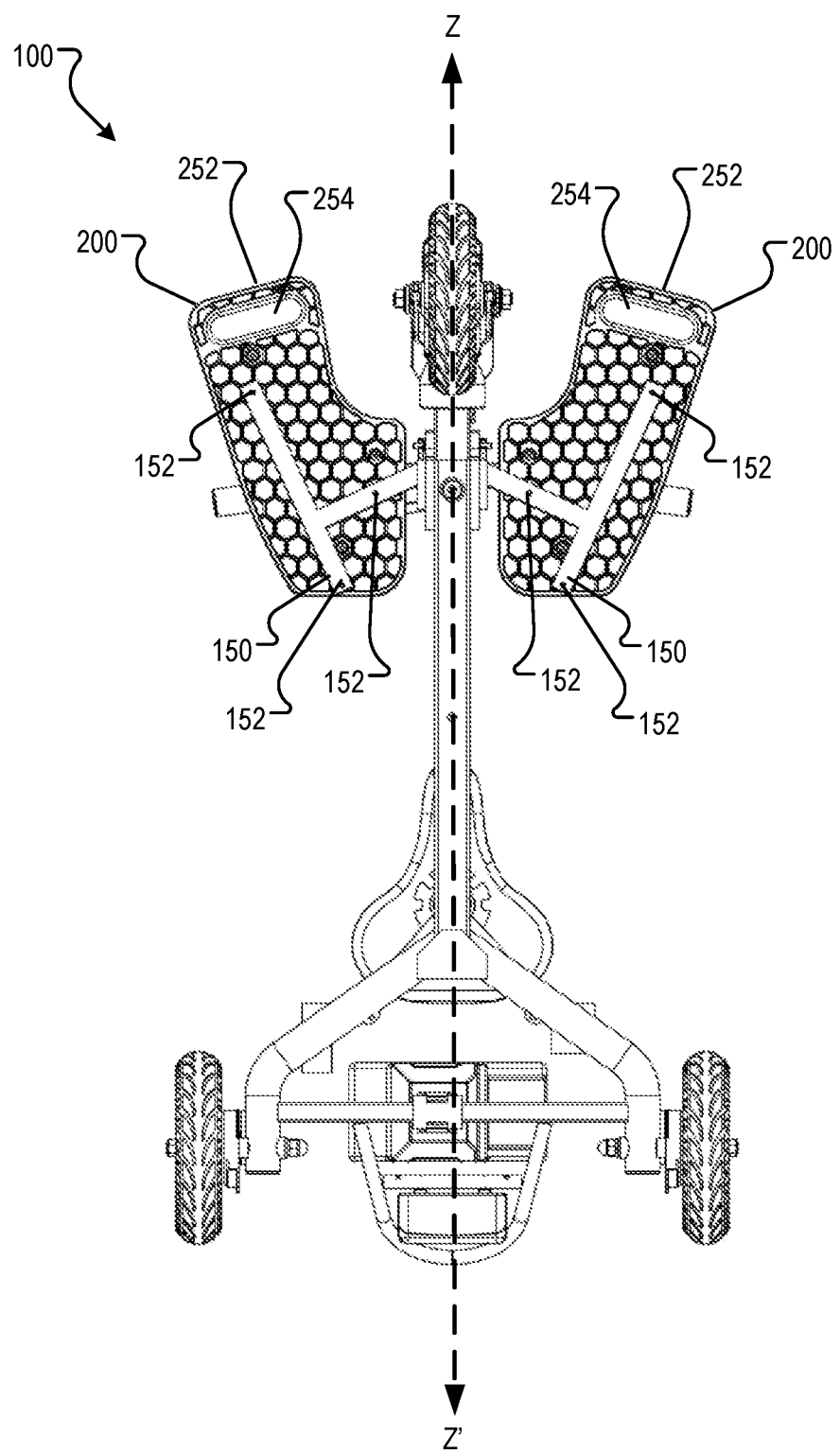
FIG. 3 is a bottom view of the portable conveyance in the riding configuration.

FIGS. 1, 2 and 3 are illustrations of an example implementation of a portable conveyance 100 in a riding configuration. In particular, FIG. 1 is a perspective view of a portable conveyance 100 in the riding configuration, FIG. 2 is a side view of the portable conveyance in the riding configuration, and FIG. 3 is bottom view of the portable conveyance 100 in the riding configuration.

The portable conveyance includes a body base 110 to which is attached a folding device 112 and seat tube 120. A variety of folding devices 112 may be used. In the illustrated implementation, the folding device 112 is a pivot pin 113 and locking arm 115. The pivot pin 113 is pivotally connected to head tube 111, that, in turn, is rigidly connected to a steering tube 114. Connected to the steering tube 114 is a front wheel 140 and handlebars 116 for steering the conveyance 100. The handlebars 116 are slidably inserted into the steering tube 114 by a central tube (not shown) that is also connected to the front wheel 140. The conveyance 100 may thus be steered by use of the handlebars 116. Finally, a seat 118 is held in place by placing a stem 119 of the seat into the seat tube 120. A seat retainer 121 is used to hold the seat 118 when the conveyance is in the folded position. The folding device 112 allows the steering tube 114 to pivotally rotate relative to the body base 110 between the riding and towing configuration.

At the rear of the body base 110 is a drive system 130. The drive system 130 includes two rear wheels 132, and a drive mechanism 134. The drive mechanism 134 may be a battery operated drive system that imparts driving force and breaking force on the rear wheels. Controls from the drive mechanism 134 may be disposed in the handlebars 116. Any appropriate drive mechanism 134 and control system may be used. In yet other implementations, a hub motor may be included in the front wheel 140, and the drive mechanism 134 may house a battery and additional control electronics that are not included in the hub motor of the front wheel 140.

The rear of the conveyance 100 includes a stand brace 136 that extends upward relative to the rear wheels 132. As will be described in more detail with reference to FIGS. 4 and 5, the stand brace 136 and the wheels 132 form a three-point stand when the conveyance is in a folded or towing configuration.

A user may actuate the locking arm 115 to lock and unlock the head tube 111 relative to the base 110. In FIGS. 1-3, the head tube 111 is locked in the riding configuration position. While riding the conveyance 100, the user's feet may be positioned on the footrests 200 that are disposed on either side of the body base 110. As shown in FIG. 3, the footrests 200 are connected to respective mounting extensions 150 on either side of the body base by means of fasteners 152. A variety of fasteners 152 may be used, including rivets, screws, and other appropriate fastening devices.

As will be described in more detail with reference to FIGS. 6 and 7, the footrests 200 include a tow handle 252 on a distal portion of the footrest 200 that is opposite from where users will normally position the heels of their feet. The tow handle portion 252 is at a forward end of the foot rest relative to the frame of the conveyance 100. The tow handle 252 is used to grip the conveyance 100 for towing when the conveyance is in a folded, or towing, configuration, as shown in FIGS. 4 and 5.

Figure 4:
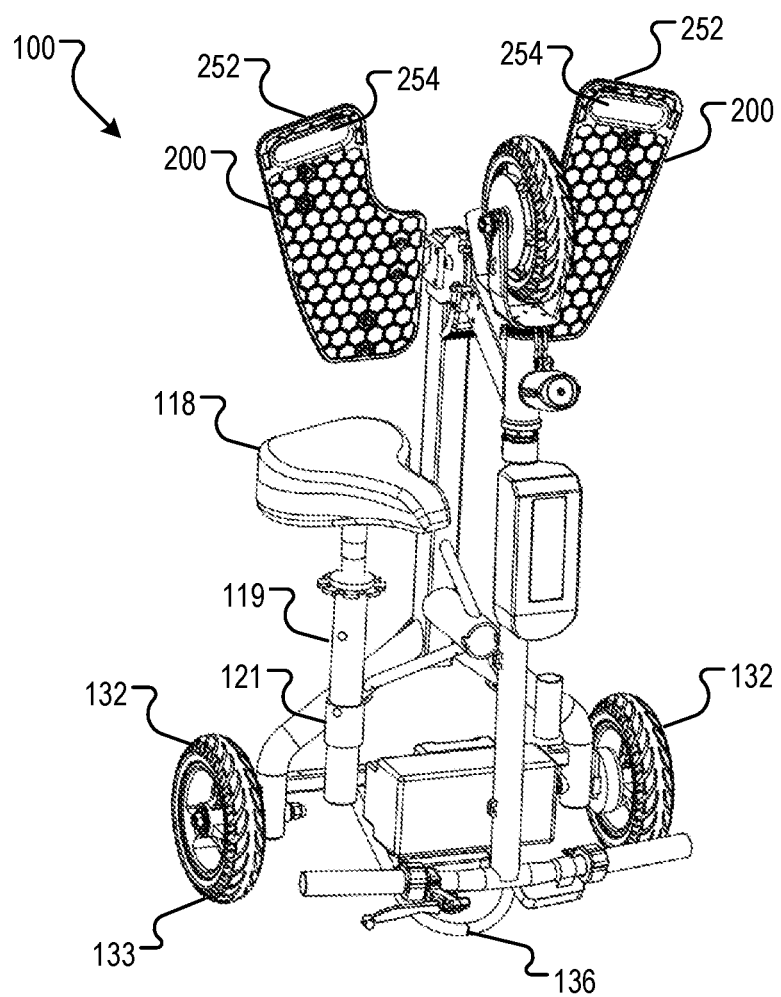
FIG. 4 is a perspective view of the portable conveyance in a towing configuration.
Figure 5:
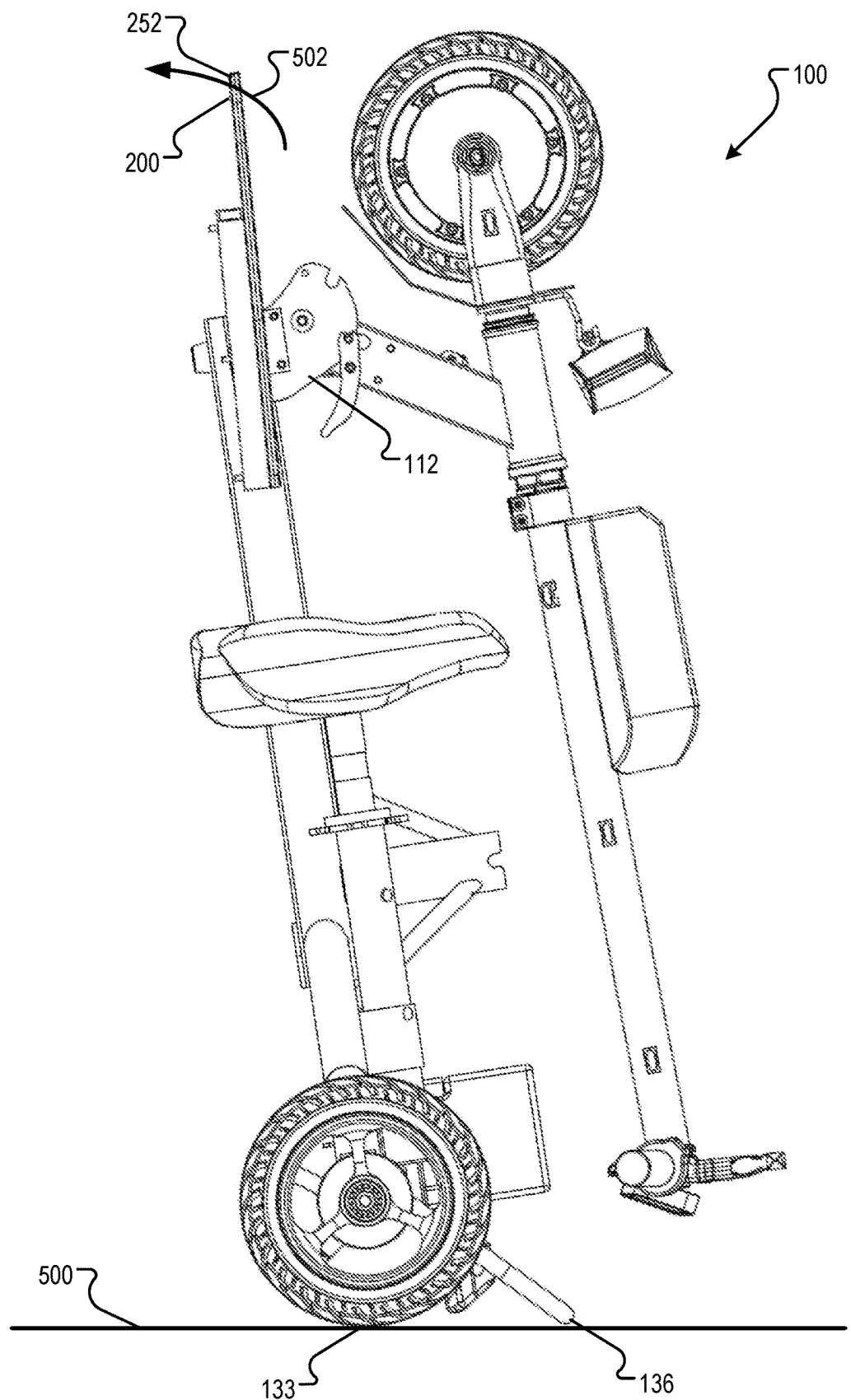
FIG. 5 is a side view of the portable conveyance in the towing configuration.

As shown in FIGS. 4 and 5, the folding device 112 is in the folded position, which places the conveyance 100 in the towing configuration. In the towing configuration, the conveyance 100 may be towed on a surface, such as the surface 500 of FIG. 5, by gripping the tow handle 252 through the void 254 of one or both footrests 200, and tilting the conveyance in the direction of the arrow 502. The user may thereafter tow (or push) the conveyance 100 until the conveyance 100 is in a location that the user desires to store the conveyance 100. The user may then tilt the conveyance 100 back until it is resting on the three-point stand formed by the surfaces 133 of wheels 132 and the stand brace 136.

The stand brace 136 is an optional feature. In other implementations, the handlebars 116 may be extended upward from the steering tube 114 such that in the towing position the conveyance may rest on the surfaces 133 of wheels 132 and the handle bars 116.

Figure 6:
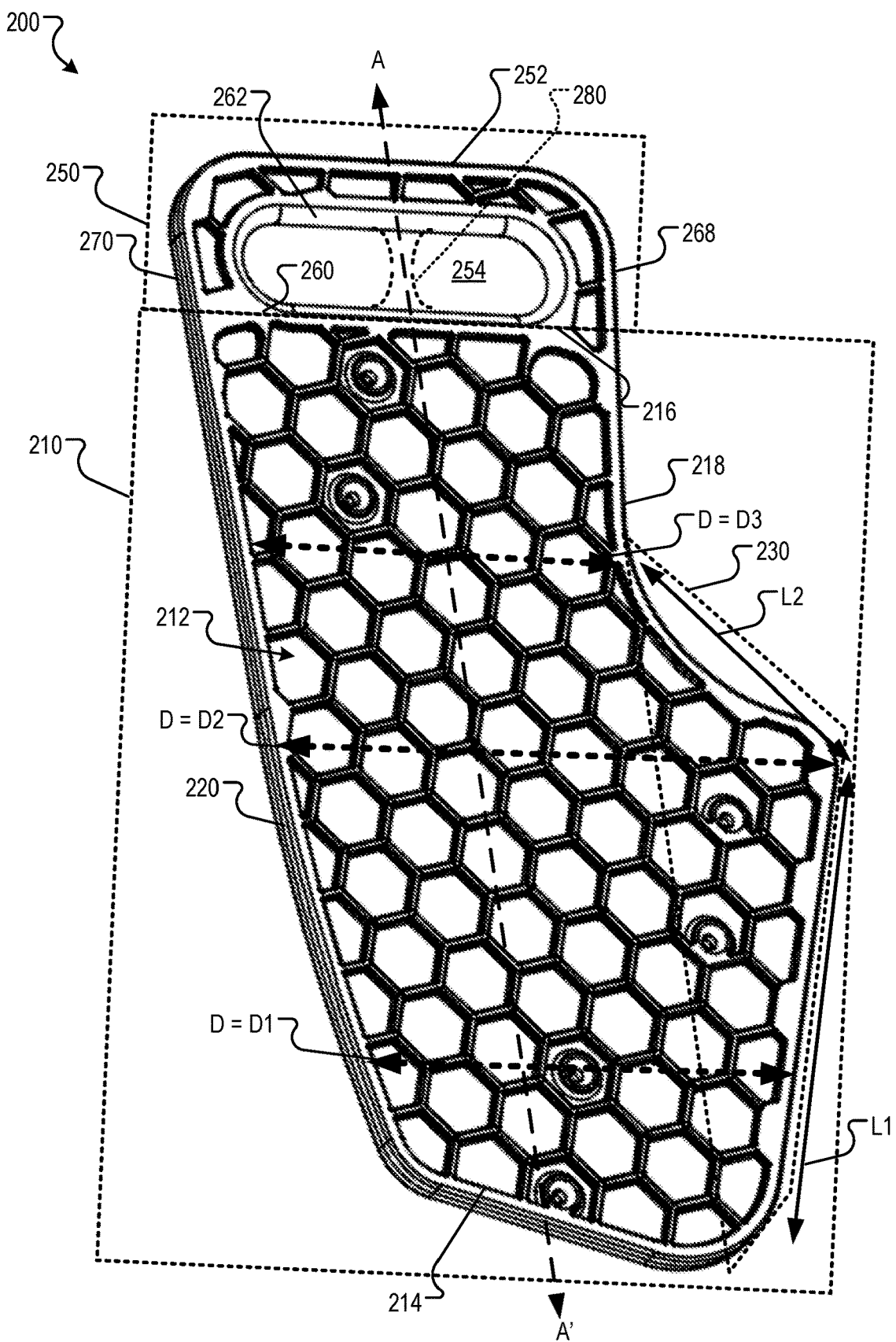
FIG. 6 is a perspective view of a footrest with an integrated tow handle for the portable conveyance.
Figure 7:
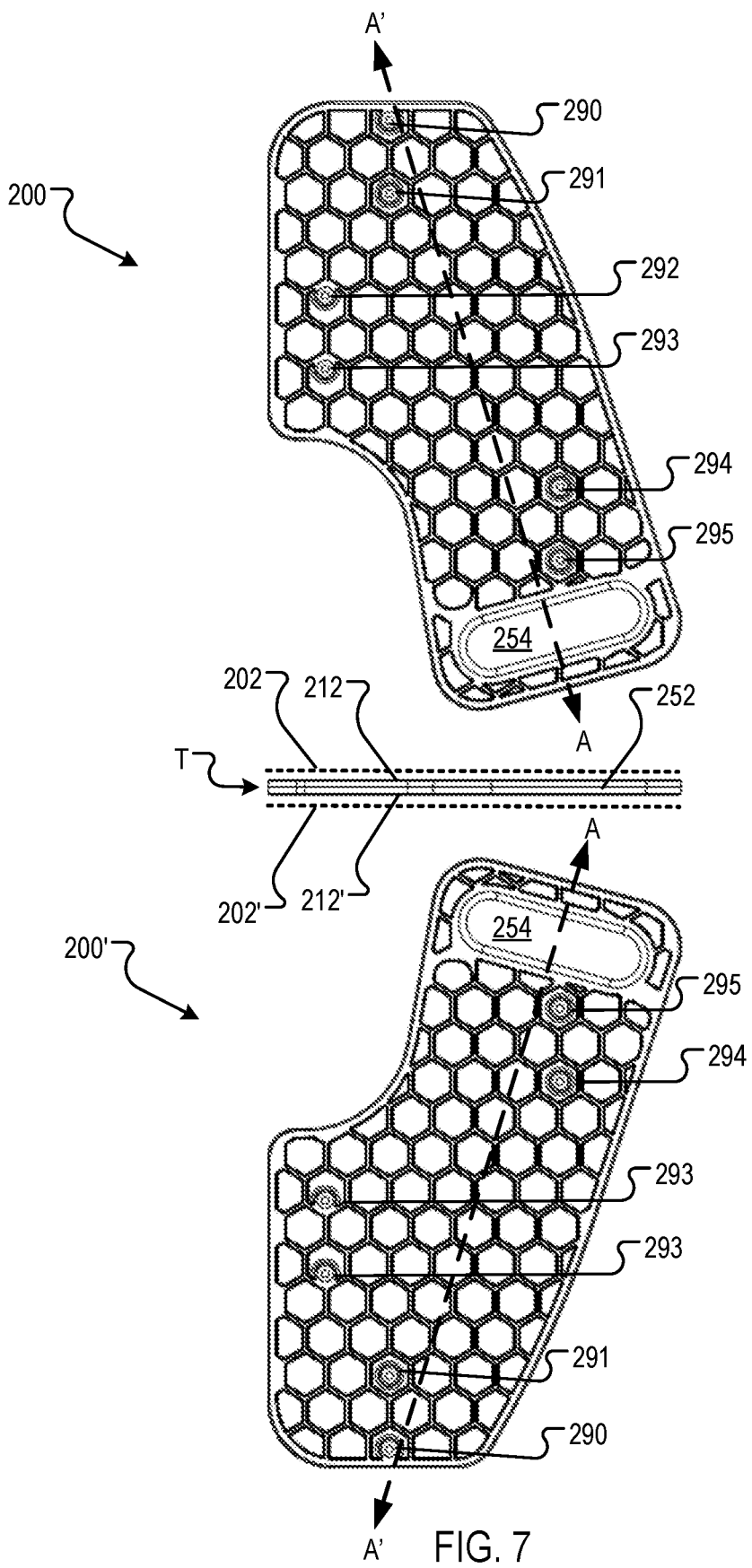
FIG. 7 is an illustration of implementation of the footrest that is reflectively symmetric.

FIGS. 6 and 7 provide illustration of an example footrest 200. In the example implementation of FIGS. 6 and 7, the footrest 200 includes a support portion 210 having a substantially planar base surface 212. The planar base surface 212 receives a heel of a foot at a first end 214 of the support portion 210 and receives another portion of the foot near the second end 216 of the support portion 210 that is opposite the first end 214. A foot is so received while a user is sitting on the seat 118 of the conveyance 100.

The footrest 200 also includes a tow handle portion 250 connected to the support portion 210 at the second end 216. The tow handle portion 250 forms a substantially planar tow handle 252 that is within a same plane 202 as the substantially planar base surface 212, as illustrated in FIG. 7. The tow handle portion 250 defines a void between 254 the tow handle 252 and the second end 216 of the support portion 210. The tow handle 252 is also disposed within the same plane 202 as the substantially planar base surface 212 so that a user's fingers, when gripping the tow handle 252, extend into the void 254 between the tow handle 252 and the second end 216 of the support portion 210 and through the plane 202 of the substantially planar surface 212.

The size of the tow handle portion 250 is smaller than the size of the support portion 210. More specially, the tow handle portion 250 is sized to provide sufficient room for four fingers of an adult hand to be placed inside of the void 254 for gripping the tow handle 252, and the width of the tow handle 252 along the axis AA' is sufficient to provide a secure grip. The support portion 210 is larger, as it is sized to receive most, if not all, an adult sized foot that is typically within a shoe.

In some implementations, the tow handle 252 is spaced apart from the second end 216 of the support portion 210 to define the void 254 between the tow handle 252 and the second end 216 of the support portion. As shown in FIG. 6, a first end 260 of the tow handle portion 250 is connected to the second end 216 of the support portion 210. A second end 262 of the tow handle portion 250 that defines an interior of the tow handle 252, and is spaced apart from the first end 260 of the tow handle portion 250 to define the void 254 between the tow handle 252 and the second end 216 of the support portion 210.

The tow handle portion 250 may be connected to the base portion in a variety of appropriate ways. As shown in FIG. 6, the support portion 210 defines a first side 218 extending from the first end 214 of the support portion 210 to the second end 216 of the support portion 210 and within the same plane 202 of the substantially planar base surface 212. The support portion 210 also defines a second side 220 extending from the first end 214 of the support portion 210 to the second end 216 of the support portion 210 and also within the same plane 202 of the substantially planar base surface 212. The tow handle portion 250 is connected to the support portion 210 on at least one of the first side 218 of the support portion 210 and the second side 220 of the support portion 210. As shown in FIG. 6, both sides of the tow handle portion 250 are connected to the base portion. In particular, a first side 268 of the tow handle portion 250 is connected to the first side 218 of the support portion 210, and a second side 270 of the tow handle portion 250 is connected to the second side 220 of the support portion 210. The void 254 between the tow handle 252 and the second end 216 of the support portion 210 is between both the first side 268 and the second side 270 of the tow handle portion 250.

In other implementations, the tow handle may be connected by only one side, e.g., the tow handle portion 250 may omit the connection to the support portion on the first side 268, or, alternatively, on the second side 270. In yet another implementation, the tow handle 252 of the tow handle portion 250 may be connected by a substantially central stem 280 (shown in phantom), and the sides of the tow handle portion 250 may be open.

In some implementation, the footrest 200 includes an offset portion 230 that provides for an angular offset of the longitudinal axis AA' of each footrest 200 from a central longitudinal axis of the conveyance 100, e.g., longitudinal axis ZZ' of FIG. 3. This allows for a user's feet to rest at an outward angle and reduces knee caving that might result when the feet are forced into a more forward position.

The offset portion 230 is along the first side 218 of the support portion 210 and extends from the first end 214 of the support portion 210 along a first length L1. The offset portion extends out such that a distance D between the first side 218 and the second side 220 increases along a first portion of a longitudinal axis AA' measured from the first end 214 of the support portion 210 to the second end 216 of the support portion 210. For example, as shown in FIG. 6, the distance near the first end of the footrest is approximately D1, and increases to D2 at the end of the length L1.

In some implementations, the length of the support portion 210 measured along the longitudinal axis AA' is approximately 28 cm, and the length of the tow handle portion 250 measured along the longitudinal axis AA' is approximately 4.5 cm. The dimensions of the void 254, in some implementations, is approximately 2.5 cm along the longitudinal axis AA', and the width of the void 254 measured approximately perpendicularly from the longitudinal axis is approximately 9.5 cm. The footrest can also be of other dimensions, so long as the footrest 200 is sufficiently sized to receive a sole an adult-sized shoe and the void 254 is sufficiently sized to allow a person's fingers to penetrate and secure a positive grip on the tow handle portion 250.

The offset portion 230, in some implementations, may taper off along another length L2 such that a distance D between the first side 218 and the second side 220 decreases along the second portion of the longitudinal axis AA'. For example, as shown in FIG. 6, along the length L2, the distance D decreases from D2 to D3.

In some implementations, the footrest 200 is reflectively symmetric. In particular, support portion 210 and the tow handle portion 250 form a reflectively symmetric geometry, which means that each footrest 200 may be mounted on either a right side or left side of the conveyance by flipping the footrest 200. Thus, as illustrated in FIG. 7, both sides of the footrest 200 can be used as the planar base surface 212.

In a variation of this implementation, the support portion 210 and the tow handle portion 250 have a constant cross-sectional thickness T, as indicated in FIG. 7. In other implementations, however, the cross-sectional thickness can increase, e.g., the footrest 200 may have a cross section at the tow handle 200 that is thicker than the cross section at the first end 214 of the support portion 210.

The support portion 210 includes a plurality of mounting holes 290-295 within the support portion 210. The mounting holes 290-295 are used to affix the footrest 200 to the conveyance 100, such as by means of the mounting extension 150. As shown in FIGS. 6 and 7, multiple mounting holes 290-295 vertically penetrate the cross sectional thickness of the footrest 200, substantially normal to the plane 202. Not all of the mounting holes are required to mount the footrest 200 to a particular mounting extension 150. This facilities the use of the footrest 200 for multiple different extension configurations. The holes 290-295 are, in some implementations, paired, e.g., (290, 291), (292, 293) and (294, 295), and the foot rest is attached at three points, with one attachment point in each hole of a respective pair. This allows for the foot rest to be positioned at two different positions to accommodate for a particular user's height.

In some implementations, the seat of the conveyance may be too large to mount in a seat retainer when the conveyance is in a folded position for towing. Provided the seat, when folded, has a slot thorough which the footrest may be inserted, the footrest of this disclosure provides the added advantaged of serving as a mount for the folded seat.

Figure 8:
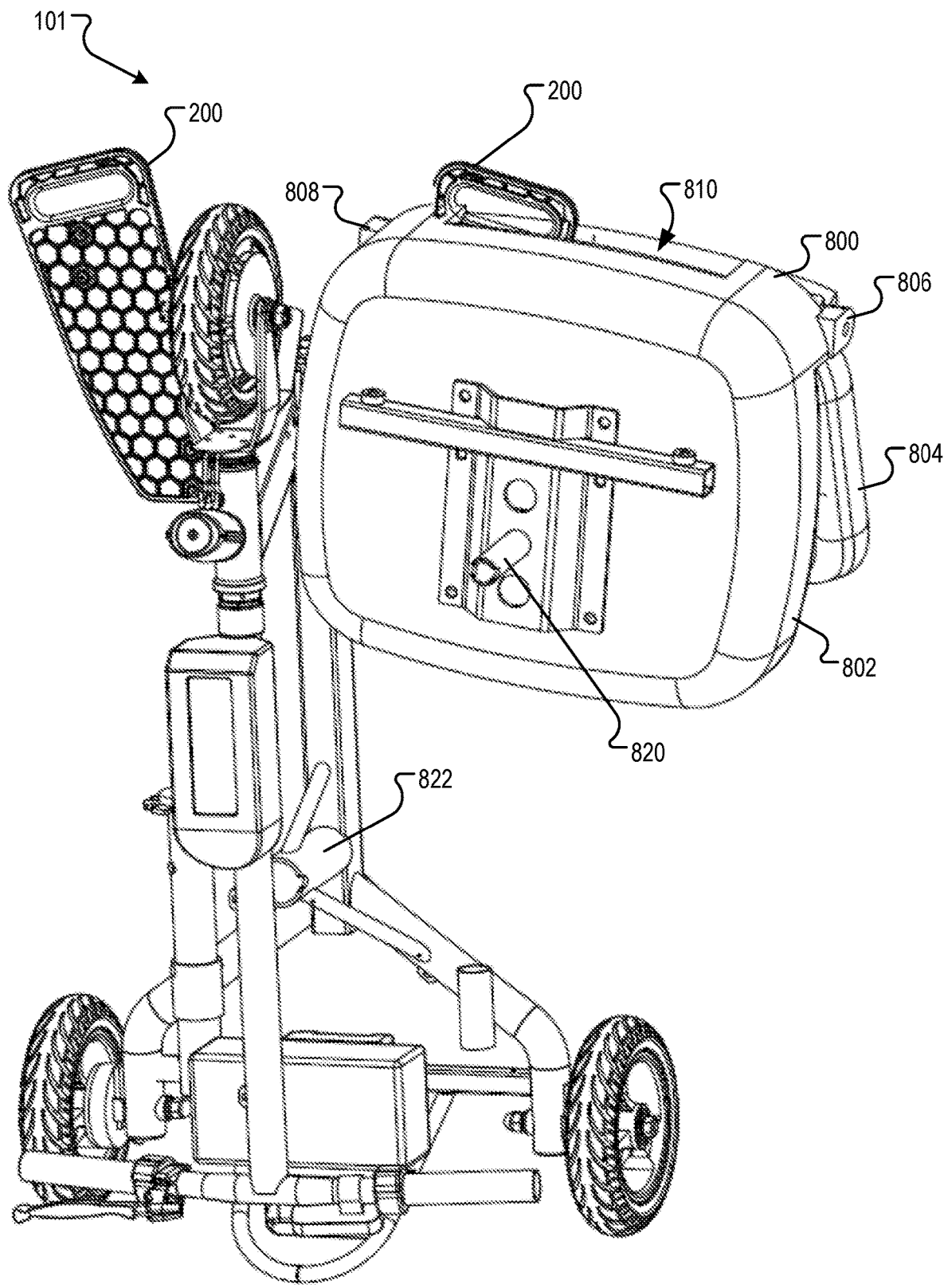
FIG. 8 is perspective view of a portable conveyance in a towing configuration and in which a folding seat is stored on one of the footrests.

FIG. 8 is perspective view of a portable conveyance 101 in a towing configuration and in which a folding seat 800 is stored on one of the footrests 200. The seat 800 is a larger seat with a seat portion 802 and backrest portion 804 that are connected by hinges 806 and 808. A seat stem 820 is received in the seat tube 120 when the conveyance 101 is in an unfolded position. When in the folded position, however, the conveyance 101 must have the seat 800 removed. Accordingly, the seat 800 may be received by the footrest 200 by placing the footrest 200 through a gap 810 that is present when the seat 800 is in a folded position.

The distal extension of the footrest 200, e.g., tow handle portion 250, provides a convenient mounting tab upon which the folded 800 seat may be stored. Note that in this implementation, the footrest 200 need not include a handle portion, and instead may facilitate the same mounting function for the seat 800 without a tow handle portion.

While this specification contains many specific implementation details, these should not be construed as limitations on the scope of any inventions or of what may be claimed, but rather as descriptions of features specific to particular embodiments of particular inventions. The dimensions described and/or shown are illustrative, and dimensions may vary from those described and/or shown.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims.

What is claimed is:

1. A portable conveyance footrest, comprising:
a support portion having a substantially planar base surface to receive a heel of a foot at a first end of the support portion and to receive another portion of the foot at a second end of the support portion that is opposite the first end so that a foot so received may rest on the substantially planar base surface;
a plurality of mounting holes penetrating the support portion, each mounting hole sized to receive a fastener to fasten the support portion to a first support extension on a first side of a portable conveyance or a second support extension on a second side of the portable conveyance; and
a tow handle portion connected to the support portion at the second end, the tow handle portion forming a substantially planar tow handle that is within a same plane as the substantially planar base surface, the tow handle portion defining a void between the tow handle and the second end of the support portion, the tow handle disposed within the same plane as the substantially planar base surface so that a user's fingers, when gripping the tow handle, extend into the void between the tow handle and the second end of the support portion and through the plane of the substantially planar surface;
wherein the support portion and the tow handle portion form a reflectively symmetric geometry so the portable conveyance footrest is configured to be mounted on the first support extension when in a first position and configured to be mounted on the second support extension when in a second position, wherein the second position is a flipped position relative to the first position.

2. The portable conveyance footrest of claim 1, wherein the tow handle is spaced apart from the second end of the support portion to define the void between the tow handle and the second end of the support portion.

3. The portable conveyance footrest of claim 1, wherein the two handle portion comprises:
a first end that is connected to the second end of the support portion; and
a second end that defines an interior of the tow handle, the second end of the tow handle portion spaced apart from the first end of the tow handle portion to define the void between the tow handle and the second end of the support portion.

4. The portable conveyance footrest of claim 1, wherein:
the support portion defines a first side extending from the first end of the support portion to the second end of the support portion and within the same plane of the substantially planar base surface;
the support portion defines a second side extending from the first end of the support portion to the second end of the support portion and within the same plane of the substantially planar base surface; and
the tow handle portion is connected to the support portion at at least one of the first side of the support portion and the second side of the support portion.

5. The portable conveyance footrest of claim 4, wherein:
a first side the tow handle portion is connected to the first side of the support portion;
a second side of the tow handle portion is connected to the second side of the support portion; and
the void between the tow handle and the second end of the support portion is between both the first side and the second side of the tow handle portion.

6. The portable conveyance footrest of claim 4, wherein the support portion includes an offset portion along the first side of the support portion and extending from the first end of the support portion along a first length such that a distance between the first side and the second side increases along a first portion of a longitudinal axis measured from the first end of the support portion to the second end of the support portion.

7. The portable conveyance footrest of claim 6, wherein the offset portion extends along a second length of the support portion such that a distance between the first side and the second side decreases along a second portion of the longitudinal axis.

8. A portable conveyance footrest, comprising:
a support portion having a substantially planar base surface to receive a heel of a foot at a first end of the support portion and to receive another portion of the foot at a second end of the support portion that is opposite the first end so that a foot so received may rest on the substantially planar base surface;
a plurality of mounting holes penetrating the support portion, each mounting hole sized to receive a fastener to fasten the support portion to a support extension; and
a tow handle portion connected to the support portion at the second end, the tow handle portion forming a substantially planar tow handle that is within a same plane as the substantially planar base surface, the tow handle portion defining a void between the tow handle and the second end of the support portion, the tow handle disposed within the same plane as the substantially planar base surface so that a user's fingers, when gripping the tow handle, extend into the void between the tow handle and the second end of the support portion and through the plane of the substantially planar surface;
wherein:
the support portion defines a first side extending from the first end of the support portion to the second end of the support portion and within the same plane of the substantially planar base surface and includes an offset portion along the first side of the support portion and extending from the first end of the support portion along a first length such that a distance between the first side and the second side increases along a first portion of a longitudinal axis measured from the first end of the support portion to the second end of the support portion
the support portion defines a second side extending from the first end of the support portion to the second end of the support portion and within the same plane of the substantially planar base surface; and
the tow handle portion is connected to the support portion at at least one of the first side of the support portion and the second side of the support portion; and
the offset portion extends along a second length of the support portion such that a distance between the first side and the second side decreases along a second portion of the longitudinal axis;
the support portion and the tow handle portion form a reflectively symmetric geometry.

9. A portable conveyance footrest, comprising:
a support portion having a substantially planar base surface to receive a heel of a foot at a first end of the support portion and to receive another portion of the foot at a second end of the support portion that is opposite the first end so that a foot so received may rest on the substantially planar base surface;
a plurality of mounting holes penetrating the support portion, each mounting hole sized to receive a fastener to fasten the support portion to a support extension; and
a tow handle portion connected to the support portion at the second end, the tow handle portion forming a substantially planar tow handle that is within a same plane as the substantially planar base surface, the tow handle portion defining a void between the tow handle and the second end of the support portion, the tow handle disposed within the same plane as the substantially planar base surface so that a user's fingers, when gripping the tow handle, extend into the void between the tow handle and the second end of the support portion and through the plane of the substantially planar surface;
wherein:
the support portion defines a first side extending from the first end of the support portion to the second end of the support portion and within the same plane of the substantially planar base surface and includes an offset portion along the first side of the support portion and extending from the first end of the support portion along a first length such that a distance between the first side and the second side increases along a first portion of a longitudinal axis measured from the first end of the support portion to the second end of the support portion;
the support portion defines a second side extending from the first end of the support portion to the second end of the support portion and within the same plane of the substantially planar base surface; and
the tow handle portion is connected to the support portion at at least one of the first side of the support portion and the second side of the support portion;
the offset portion extends along a second length of the support portion such that a distance between the first side and the second side decreases along a second portion of the longitudinal axis; and
the support portion and the tow handle portion have a constant cross-sectional thickness.

10. The portable conveyance footrest of claim 8, wherein the plurality of mounting holes are symmetrically disposed so that the portable conveyance footrest may be used on either a right side of a portable conveyance and upon which a foot may rest on a first surface of the portable conveyance footrest or a left side of a portable conveyance and upon which a foot may rest on a second surface of the portable conveyance footrest that is opposite the first surface of the portable conveyance footrest.

11. A personal conveyance, comprising:
a foldable frame, comprising:
a body base;
a drive system attached to a rear of the body base, a drive mechanism including a pair of rear wheels and operable to impart driving force to the pair of rear wheels;
a steering tube that houses a central tube that is connected to a front wheel, wherein the central tube is operable to rotate within the steering tube to steer the front wheel;
handlebars connected to the central tube;
a folding device attached to the body base and the steering tube, the folding device allowing for the steering tube to pivotally rotate relative to the body base between a riding and towing configuration, wherein when the foldable frame is folded into a towing configuration the handlebars, by pivotal rotation of the steering tube, move toward the rear wheels until the folding device locks the foldable frame into the towing configuration;
a first mounting extension extending from a first side of the body base; and
a second mounting extension extending from a second side of the body base; and
a first footrest attached to the first mounting extension, and a second footrest attached to the second mounting extension, each footrest respectively including:
a support portion having a substantially planar base surface to receive a heel of a foot at a first end of the support portion and to receive another portion of the foot at a second end of the support portion that is opposite the first end so that a foot so received may rest on the substantially planar base surface; and
a tow handle portion connected to the support portion at the second end, the tow handle portion forming a substantially planar tow handle that is within a same plane as the substantially planar base surface and at a forward end of the footrest relative to the foldable frame, the tow handle portion defining a void between the tow handle and the second end of the support portion, the tow handle disposed within the same plane as the substantially planar base surface so that a user's fingers, when gripping the tow handle, extend into the void between the tow handle and the second end of the support portion and through the plane of the substantially planar surface;
wherein:
when the frame is in the riding configuration the footrests are positioned such that feet of a person riding the personal conveyance rest on the footrest; and
the tow handle portions of the footrest provide a tow handle for towing the personal conveyance.

12. The personal conveyance of claim 11, wherein the tow handle is spaced apart from the second end of the support portion to define the void between the tow handle and the second end of the support portion.

13. The personal conveyance of claim 11, wherein the two handle portion comprises:
a first end that is connected to the second end of the support portion; and
a second end that defines an interior of the tow handle, the second end of the tow handle portion spaced apart from the first end of the tow handle portion to define the void between the tow handle and the second end of the support portion.

14. The personal conveyance of claim 11, wherein:
the support portion defines a first side extending from the first end of the support portion to the second end of the support portion and within the same plane of the substantially planar base surface;
the support portion defines a second side extending from the first end of the support portion to the second end of the support portion and within the same plane of the substantially planar base surface; and
the tow handle portion is connected to the support portion at at least one of the first side of the support portion and the second side of the support portion.

15. The personal conveyance of claim 14, wherein:
a first side the tow handle portion is connected to the first side of the support portion;

a second side of the tow handle portion is connected to the second side of the support portion; and the void between the tow handle and the second end of the support portion is between both the first side and the second side of the tow handle portion.

16. The personal conveyance of claim 14, wherein the support portion includes an offset portion along the first side of the support portion and extending from the first end of the support portion along a first length such that a distance between the first side and the second side increases along a first portion of a longitudinal axis measured from the first end of the support portion to the second end of the support portion.

17. The personal conveyance of claim 16, wherein the offset portion extends along a second length of the support portion such that a distance between the first side and the second side decreases along a second portion of the longitudinal axis.

18. The personal conveyance footrest of claim 16, wherein the support portion and the tow handle portion form a reflectively symmetric geometry.

19. The personal conveyance footrest of claim 17, wherein the support portion and the tow handle portion have a constant cross-sectional thickness.

20. The personal conveyance footrest of claim 1, wherein the support portion and the tow handle portion have a constant cross-sectional thickness.

* * * * *